United States Patent [19]
Yamazaki

[11] Patent Number: 5,926,563
[45] Date of Patent: Jul. 20, 1999

[54] COLOR-IMAGE PROCESSING APPARATUS AND METHOD FOR STABLY REPRODUCING A VARIABLE-DENSITY IMAGE

[75] Inventor: Hiroyuki Yamazaki, Yokohama, Japan

[73] Assignee: Canon Kabushiki Kaisha, Tokyo, Japan

[21] Appl. No.: 08/832,273

[22] Filed: Apr. 3, 1997

Related U.S. Application Data

[63] Continuation of application No. 08/356,469, Dec. 15, 1994, abandoned.

[30] Foreign Application Priority Data

Dec. 30, 1993 [JP] Japan .................................. 5-354509

[51] Int. Cl.$^6$ .................................................. H04N 1/60
[52] U.S. Cl. ......................... 382/167; 358/519; 358/521
[58] Field of Search ........................... 358/515, 518–519, 358/298, 521, 523; 382/167, 270, 271, 276; H04N 1/60

[56] References Cited

U.S. PATENT DOCUMENTS

| | | | |
|---|---|---|---|
| 5,212,560 | 5/1993 | Hattori et al. | 358/518 |
| 5,216,498 | 6/1993 | Matsunawa et al. | 358/518 |
| 5,237,400 | 8/1993 | Washio et al. | 358/518 |
| 5,386,305 | 1/1995 | Usami | 358/518 |
| 5,453,773 | 9/1995 | Hattori et al. | 358/298 |
| 5,589,954 | 12/1996 | Watanabe | 358/518 |
| 5,608,823 | 3/1997 | Ohtami | 382/271 |

*Primary Examiner*—Kim Yen Vu
*Attorney, Agent, or Firm*—Fitzpatrick, Cella Harper & Scinto

[57] ABSTRACT

In a color-image processing apparatus and method, density data for a plurality of colors are input, and density correction is performed for each of the input density data for the plurality of colors while switching a plurality of correction tables having different density correction characteristics at predetermined periods.

21 Claims, 10 Drawing Sheets

| TABLE | NUMBER OF LINES | COLOR |
|---|---|---|
| $b\gamma_Y \times \gamma_Y$ | 300 | Y |
| $b\gamma'_Y \times \gamma'_Y$ | 600 | Y |

| TABLE | NUMBER OF LINES | COLOR |
|---|---|---|
| $b\gamma_{M1} \times \gamma_M$ | 300 | M |
| $b\gamma'_{M1} \times \gamma'_M$ | 600 | M |
| $b\gamma_{C1} \times \gamma_C$ | 300 | C |
| $b\gamma'_{C1} \times \gamma'_C$ | 600 | C |
| $b\gamma_{K1} \times \gamma_K$ | 300 | BK |
| $b\gamma'_{K1} \times \gamma'_K$ | 600 | BK |

| TABLE | NUMBER OF LINES | COLOR |
|---|---|---|
| $b\gamma_{M2} \times \gamma_M$ | 300 | M |
| $b\gamma'_{M2} \times \gamma'_M$ | 600 | M |
| $b\gamma_{C2} \times \gamma_C$ | 300 | C |
| $b\gamma'_{C2} \times \gamma'_C$ | 600 | C |
| $b\gamma_{K2} \times \gamma_K$ | 300 | BK |
| $b\gamma'_{K2} \times \gamma'_K$ | 600 | BK |

| TABLE | NUMBER OF LINES | COLOR |
|---|---|---|
| $b\gamma_{M3} \times \gamma_M$ | 300 | M |
| $b\gamma'_{M3} \times \gamma'_M$ | 600 | M |
| $b\gamma_{C3} \times \gamma_C$ | 300 | C |
| $b\gamma'_{C3} \times \gamma'_C$ | 600 | C |

| $b\gamma_Y$ |
|---|
| $b\gamma'_Y$ |

| $b\gamma_{M1}$ |
|---|
| $b\gamma'_{M1}$ |
| $b\gamma_{C1}$ |
| $b\gamma'_{C1}$ |
| $b\gamma_{K1}$ |
| $b\gamma'_{K1}$ |

| $b\gamma_{M2}$ |
|---|
| $b\gamma'_{M2}$ |
| $b\gamma_{C2}$ |
| $b\gamma'_{C2}$ |
| $b\gamma_{K2}$ |
| $b\gamma'_{K2}$ |

| $b\gamma_{M3}$ |
|---|
| $b\gamma'_{M3}$ |
| $b\gamma_{C3}$ |
| $b\gamma'_{C3}$ |

NEW-DENSITY-CORRECTION TABLE

| $\gamma_Y$ |
|---|
| $\gamma'_Y$ |
| $\gamma_M$ |
| $\gamma'_M$ |
| $\gamma_C$ |
| $\gamma'_C$ |
| $\gamma_K$ |
| $\gamma'_K$ |

$\gamma$ TABLE

COLOR-IMAGE PROCESSING APPARATUS AND METHOD FOR STABLY REPRODUCING A VARIABLE-DENSITY IMAGE

This application is a continuation of application Ser. No. 08/356,469, filed Dec. 15, 1994, now abandoned.

BACKGROUND OF THE INVENTION

1. Field of the Invention

This invention relates to a color-image processing apparatus. More specifically, the invention relates to color-data correction processing capable of reproducing a stable variable-density image.

2. Description of the Related Art

Figure 1:
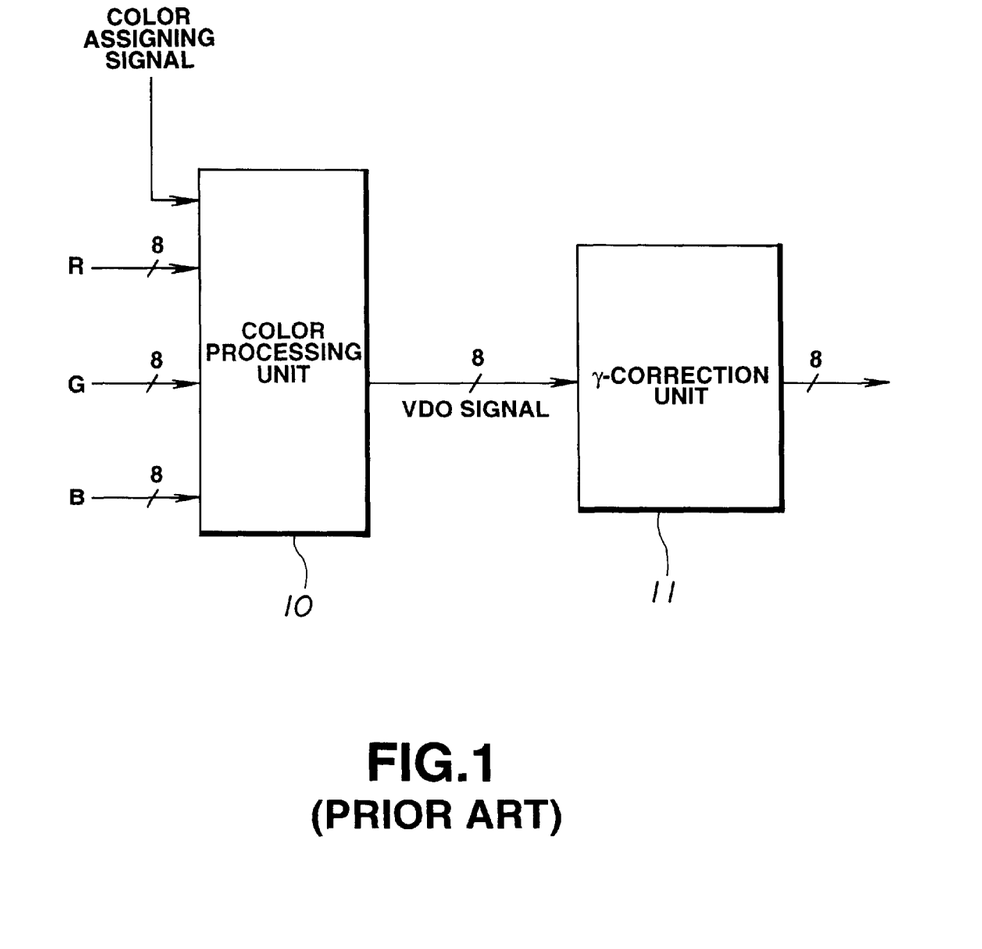
FIG. 1 is a block diagram illustrating an image processing unit of a conventional color-image processing apparatus.

An image processing unit of a conventional color-image reproducing apparatus has a configuration shown in FIG. 1.

In FIG. 1, a color processing unit 10 receives R (red), G (green) and B (blue) image signals, each comprising 8 bits, i.e., 24 bits in total, and converts the received signals into an 8-bit VDO (video) signal, comprising a Y (yellow) signal, an M (magenta) signal, a C (cyan) signal or a BK (black) signal, in accordance with a color assigning signal.

Each VDO signal, comprising a Y signal, an M signal, a C signal or a BK signal, is subjected to γ correction by a γ-correction unit 11 so that the correlation between density data and the density of actually printed data is close to linear, and is converted into an 8-bit signal.

Since each of Y, M, C and BK colors has its peculiar density curve (the correlation between density-level data and the density of actually printed data), the γ-correction unit 11 includes a table, called a γ table, for each color, and correction is performed by multiplying an input signal of each color by a γ coefficient.

In the configuration shown in FIG. 1, a relatively stable image is obtained in the case of a color-image reproducing apparatus only having a low-resolution printing capability. On the other hand, in the case of an image reproducing apparatus having a high resolution of about 600 dpi (dots per inch), the size of one pixel (picture element) is considerably reduced. Accordingly, when the density level is lower than a certain level, the size of a printed dot becomes very small, so that the dot is not printed in a stable manner. Hence, low-density portions in an image are not stably printed, so that the difference between high-density portions and low-density portions is unstable. Moreover, low-density portions under a certain density level are not printed at all.

The stability differs for each of Y, M, C and BK colors. For example, while Y images are relatively stably printed from high-density regions up to low-density regions, BK, M and C images have inferior stability.

Particularly, intermediate-density regions are unstably printed in the case of M images, and instability in low-density regions is pronounced in the case of C images.

Since visual impression differs for respective colors, the above-described instability in respective colors causes the problem that a printed image has a color tone different from that of an original image. Color-image reproducing apparatuses have the above-described problems.

SUMMARY OF THE INVENTION

The present invention has been made in consideration of the above-described problems.

It is an object of the present invention to provide a color-image reproducing apparatus and method which can reproduce a stable variable-density image even when reproducing color data with high resolution.

According to one aspect, the present invention, which achieves the above-described object, relates to a color-image processing apparatus, comprising input means for inputting density data for a plurality of colors, correction means for performing density correction for each of the density data for the plurality of colors input to the input means using a plurality of correction tables having different density correction characteristics, selection means for selecting an arbitrary correction table from among the plurality of correction tables at predetermined periods, and switching means for switching the mode of the selection by the selection means for every color.

In the case where two correction tables are used, one of the tables is a correction table for correcting a first color density level to a corrected density level higher than the first level and outputting the corrected level, and the other table is a correction table for correcting the first color density level to a corrected density level lower than the first level and outputting the corrected level.

The color image processing apparatus also includes pulse width modulation means for generating a pulse width modulation signal based on the density data corrected by the correction means, and frequency switching means for switching a spatial frequency of a pulse width in the pulse width modulation. The selection means selects a predetermined correction table from the plurality of correction tables in accordance with the output of the frequency switching means.

According to another aspect, the present invention relates to a color-image processing apparatus, comprising input means for inputting density data for a plurality of colors, and correction means for performing density correction for each of the density data for the plurality of colors input to the input means while switching a plurality of correction tables having different density correction characteristics at predetermined periods.

According to still another aspect, the present invention relates to a color-image processing apparatus, comprising input means for inputting density data for a plurality of colors, and correction means for performing density correction for each of the density data for the plurality of colors input to the input means by switching a plurality of correction means having different density correction characteristics at predetermined periods.

According to yet another aspect, the present invention relates to a color-image processing method, comprising the steps of inputting density data for a plurality of density data, and performing density correction for each of the input density data for the plurality of colors while switching a plurality of correction tables having different density correction characteristics at predetermined periods.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

First Embodiment

A first embodiment of the present invention will now be described. In this embodiment, the input density level of each of R, G and B image signals comprises 8 bits. The present embodiment relates to an image reproducing apparatus which uses a color electrophotographic technology.

Figure 2:
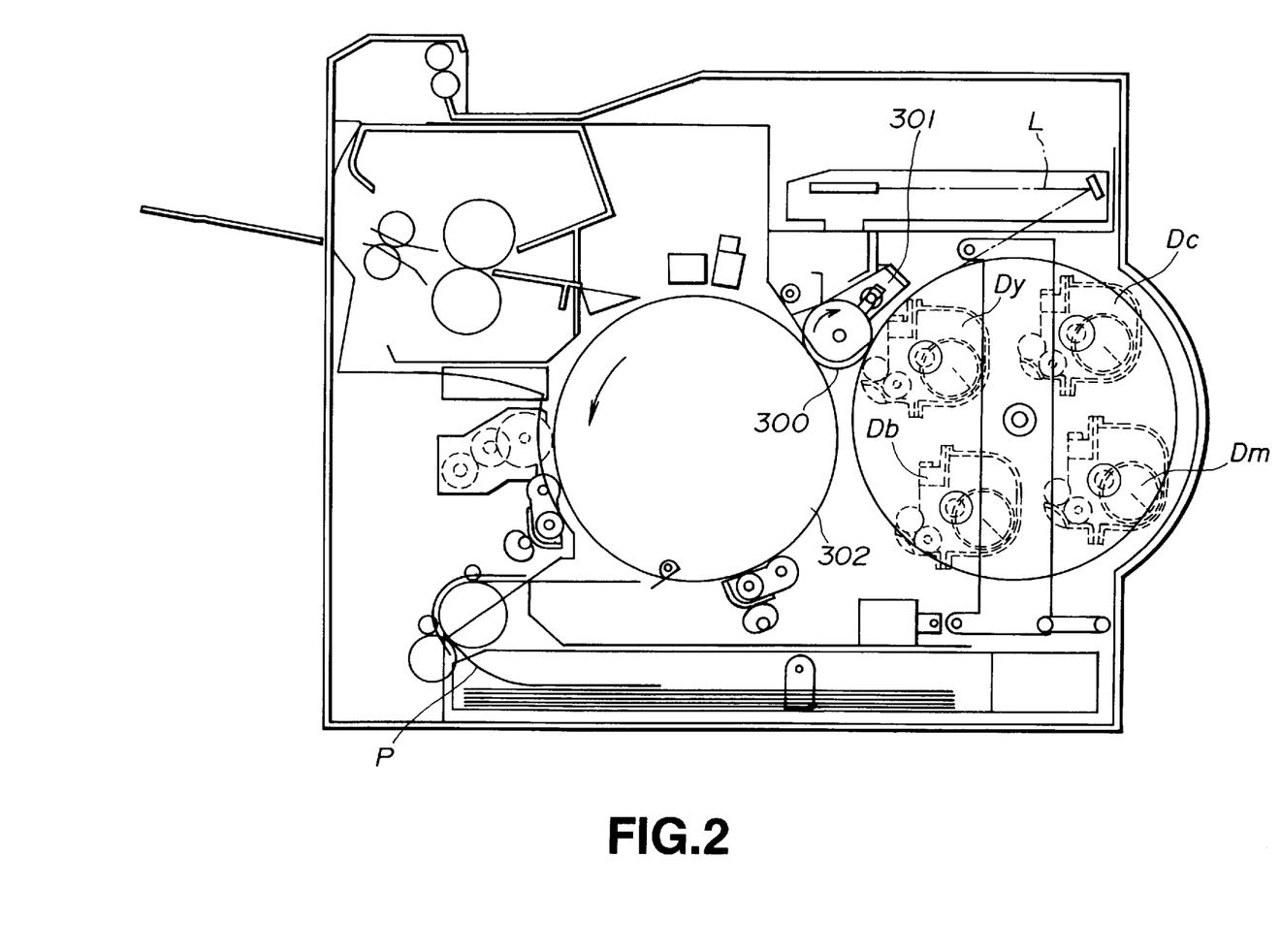
FIG. 2 is a diagram illustrating the configuration of a printing unit of a color-image reproducing apparatus according to a first embodiment of the present invention.

FIG. 2 is a diagram illustrating the configuration of a color-image reproducing apparatus according to the first embodiment. In FIG. 2, a photosensitive drum 300 is first uniformly charged to a predetermined polarity by a charger 301. Then, a first latent image, for example, a magenta (M) image, is formed on the photosensitive drum 300 by exposure by a laser beam L. In this case, a necessary bias voltage for development is applied only to a magenta (M) developing unit Dm, to develop the magenta (M) latent image and to form a first toner image of magenta, and the toner image is transferred onto transfer paper P.

Next, a second latent image of cyan (C) is formed on the photosensitive drum 300 by the laser beam L. The second latent image on the photosensitive drum 300 is then developed by a cyan (C) developing unit Dc, and a second toner image of cyan (C) is formed. The second toner image of cyan (C) is tranferred onto the transfer paper P while being aligned with the first toner image of magenta (M), which has been tranferred to the transfer paper P. In the tranfer of the second toner image, a bias voltage of +2.1 KV is applied to a transfer drum 302 immediately before the transfer paper P reaches a transfer portion.

Similarly, third and fourth latent images of yellow (Y) and black (BK), respectively, are sequentially formed on the photosensitive drum 300, are sequentially developed by developing units Dy and Db, and the developed third and fourth images of yellow (Y) and black (BK), respectively, are sequentially transferred onto the transfer paper P while being aligned with the already tranferred images, so that four-color toner images are superposed on the transfer paper P.

Figure 3:
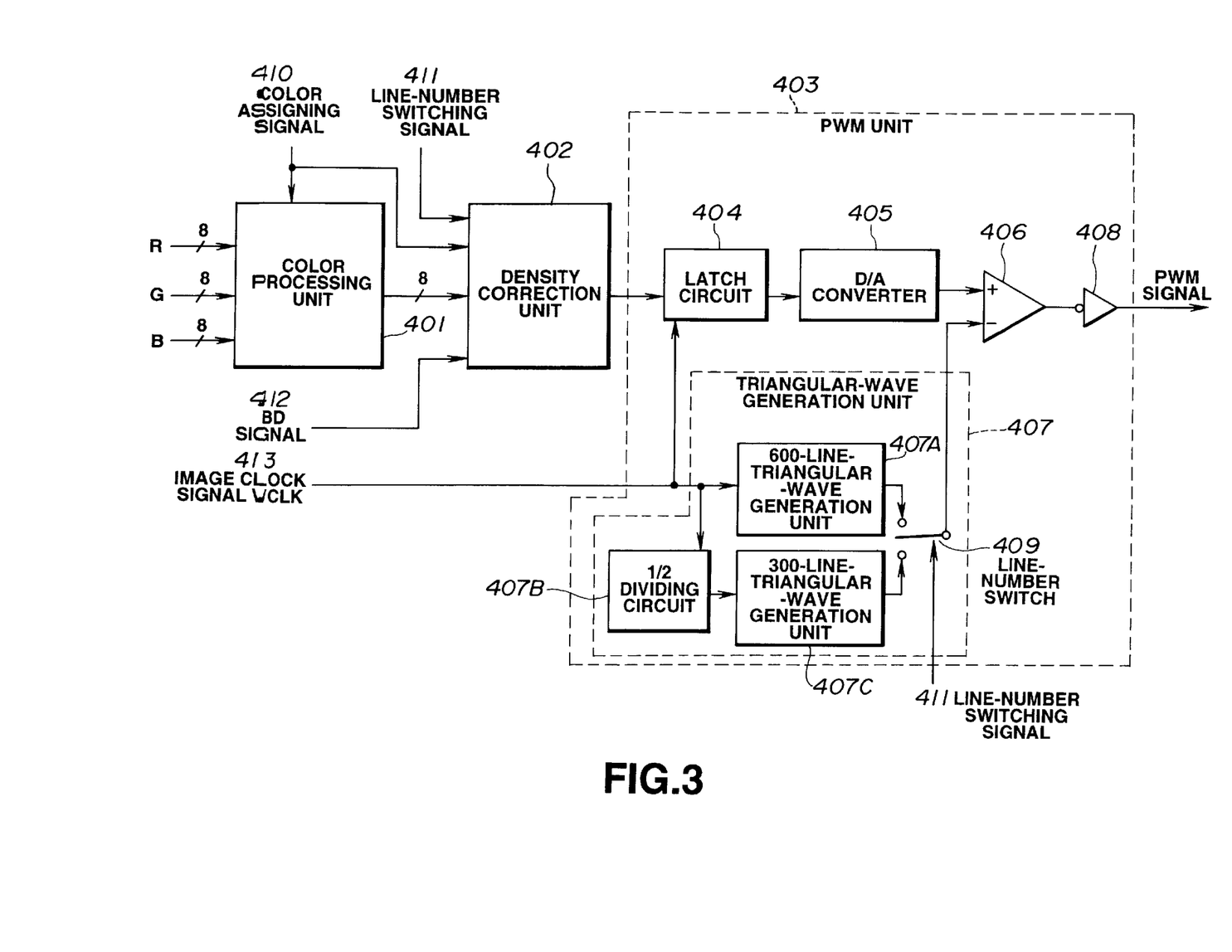
FIG. 3 is a block diagram illustrating an image processing unit of the color-image reproducing apparatus shown in FIG. 2.

FIG. 3 is a block diagram illustrating an image processing unit of the color-image reproducing apparatus for performing processing from receiving R, G and B image signals until transmitting printing information to a laser driving unit, in order to perform the above-described printing operation. Yellow, magenta, cyan and black will be hereinafter represented by Y, B, C and BK.

In the configuration shown FIG. 3, density correction processing is added to conventional γ correction. In FIG. 3, a color processing unit 401 receives 24-bit R, G and B image signals. As described above, in the present image reproducing apparatus, Y, M, C and BK images are sequentially printed on one picture frame. Hence, image data are transmitted in the sequence of frames, i.e., in the order of M data for one picture frame, C data for one picture frame, Y data for one picture frame, and BK data for one picture frame. Accordingly, the color processing unit 401 first converts R, G and B image data for one pixel of one picture frame into 8-bit M VDO signal, and then into C, Y and BK signals in this sequence. The color signal, from among M, C, Y and BK signals, to be converted from the input R, G and B signals by the color processing unit 401 is assigned by a color assigning signal 410 transmitted from a formatter unit. That is, the color assigning signal first assigns M, and then C, Y and BK in this order every time data for one picture frame has been transmitted. Thereafter, the signal converted using density correction means (to be described later) by a density correction unit 402 is input to a PWM (pulse-width modulation) unit 403.

The PWM unit 403 synchronizes the 8-bit image signal with the leading edge of an image clock signal VCLK 413 by a latch circuit 404, converts the signal into an analog voltage by a D/A converter 405, and inputs the analog voltage to an analog comparator 406. A triangular wave is generated by a triangular-wave generation unit 407 in response to the image clock signal VCLK 413, and is input to the analog comparator 406. A signal subjected to PWM is output from the analog comparator 406 which has compared the analog voltage with the triangular wave, and is inverted by an inverter 408, whereby a PWM signal is obtained.

The color-image reproducing apparatus of the present embodiment has a printing capability of 600 dpi, and includes means for switching the frequency (the number of lines) of the triangular wave between 600 lines and 300 lines. The 600 lines and 300 lines indicate that triangular waves having wavelengths of 1/600 inches and 1/300 inches are used in the comparison by the analog comparator 406, respectively. A 600-line triangular wave is generated by a 600-line-triangular-wave generation unit 407A of the triangular-wave generation unit 407, and a 300-line triangular wave is generated by a 300-line-triangular-wave generation unit 407C which receives the output of the circuit 407A via a ½ dividing circuit 407B. One of the 600-line triangular wave and the 300-line triangular wave is selectively input to the analog comparator 406 by switching a line-number switch 409 in response to a line-number switching signal 411 input from the formatter unit. Reference number 412 represents a horizontal-scanning (main-scanning) synchronizing signal for the laser, which is called a BD signal.

The number of lines may be switched by the user using a switch provided on an operation unit. In another approach, the region of an image may be determined based on an input image signal, and 600 lines may be selected if the region comprises characters.

Figure 4:
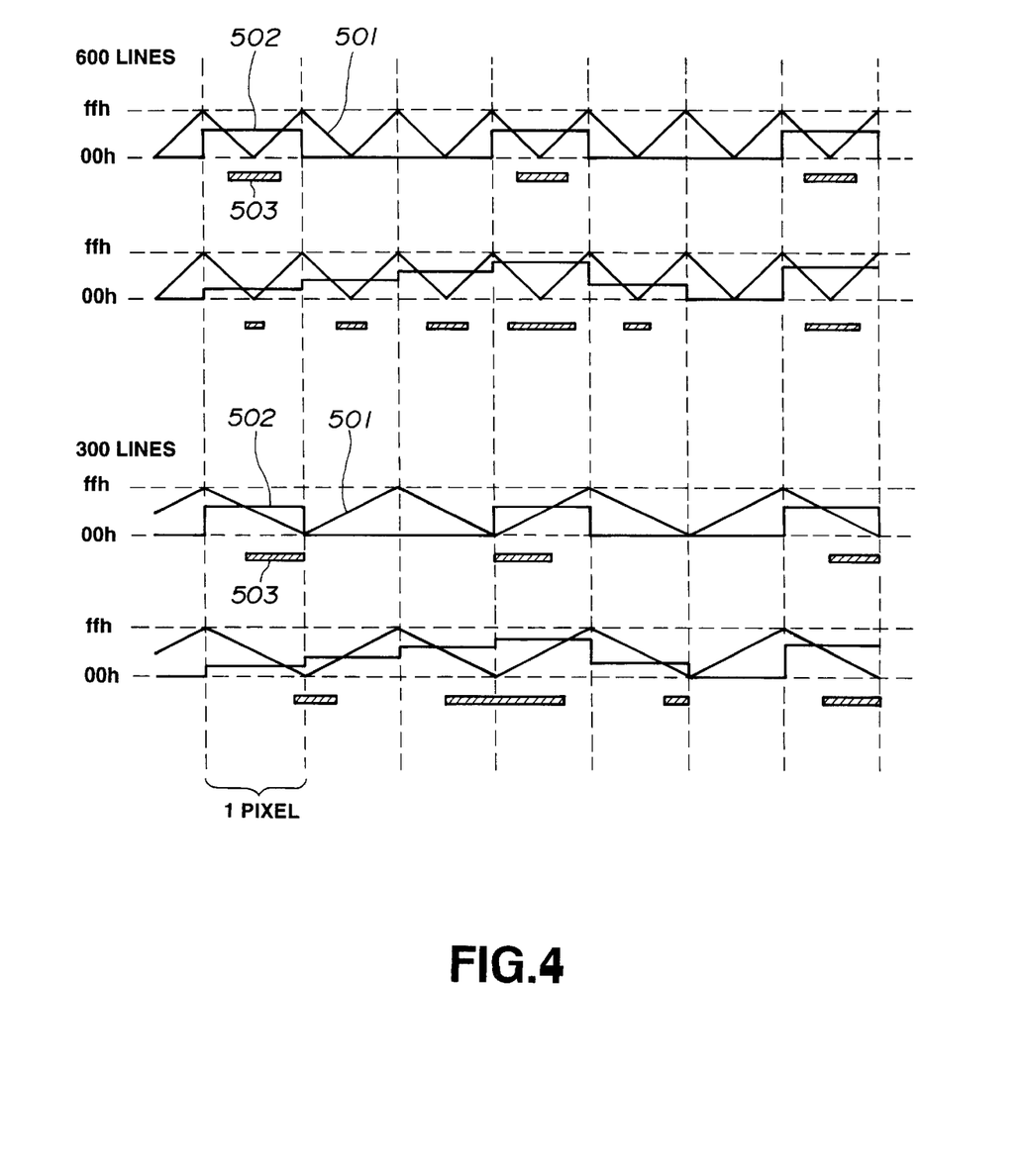
FIG. 4 is a diagram illustrating a method of comparing a triangular wave with an analog voltage in the first embodiment.

FIG. 4 illustrates the relationship between the method of comparison by the 600-line and 300-line analog comparators and the area of a printed portion. In FIG. 4, the interval between vertical broken lines corresponds to the length of one pixel, and the ordinate represents an analog voltage (00h–ffh) for each pixel which corresponds to a density level having a value between 00h–ffh. Reference numeral 501 represents a triangular wave. As is apparent from FIG. 4, the wavelength of the triangular wave for 300 lines is twice the wavelength of the triangular wave for 600 lines. The laser beam is projected only when the analog voltage 502 is higher than the triangular wave. Accordingly, toner particles are supplied only to a portion 503 of each pixel irradiated by the laser beam, so that the portion 503 is printed. The density of each pixel is determined by the area of the printed portion. Density gradation determined in this manner is called area gradation.

Figure 5:
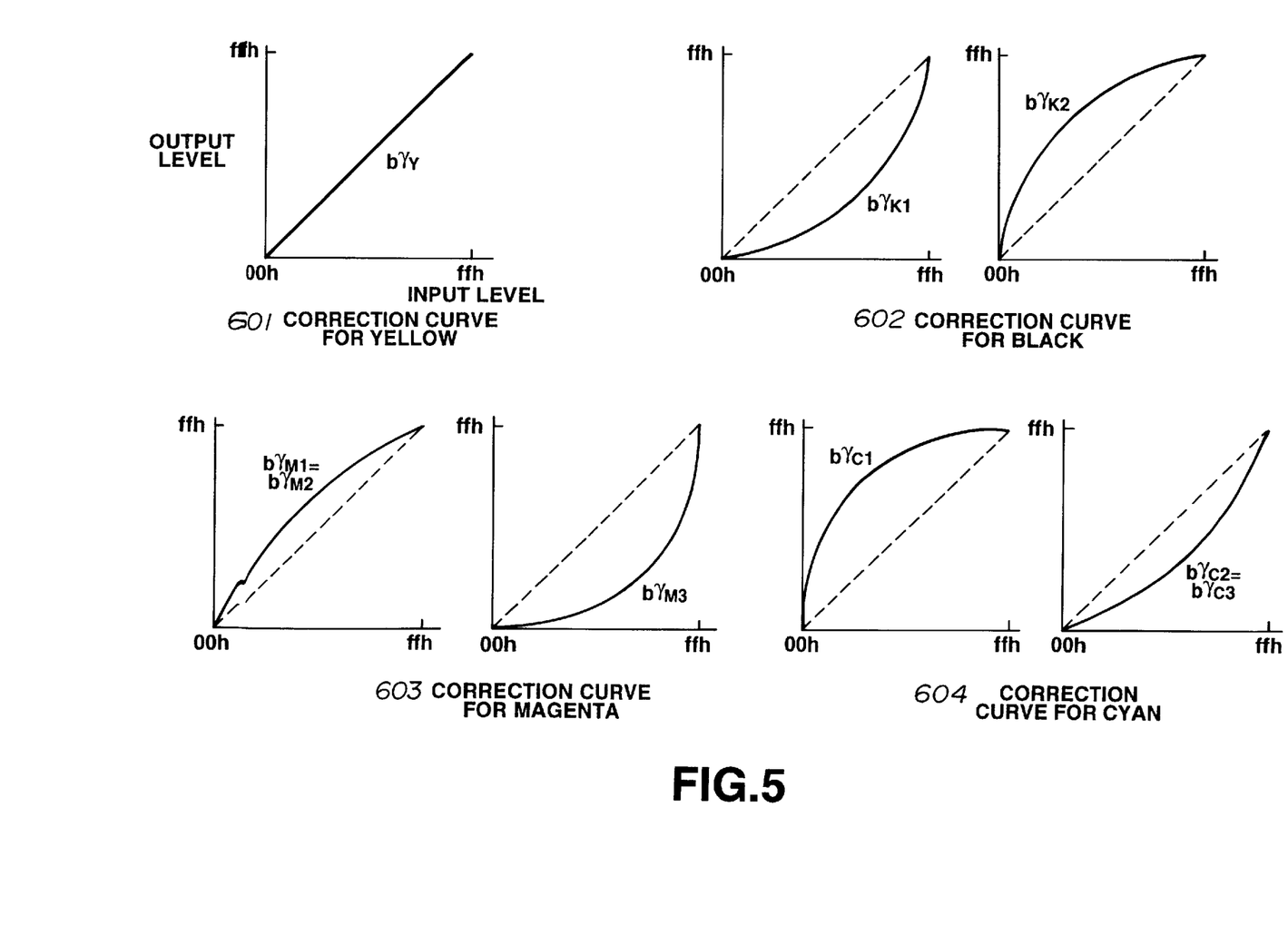
FIG. 5 is a diagram illustrating correction curves for density correction in the first embodiment.

Next, a description will be provided of the configuration of the density correction unit 402 shown in FIG. 3. Before describing the density correction unit 402, the method of correction in the present embodiment will be described. In the present embodiment, a plurality of correction-curve tables are provided for an input density level, and an output density level is determined by a correction curve selected for each line. A correction curve for each line must be determined in accordance with characteristics of each of Y, M, C and BK colors. FIG. 5 shows examples of correction curves for respective colors in the case of 300 lines. In FIG. 5, $b\gamma_Y$, $b\gamma_{K1}$ and $b\gamma_{K2}$, $b\gamma_{M1}$, $b\gamma_{M2}$ and $b\gamma_{M3}$, and $b\gamma_{C1}$, $b\gamma_{C2}$ and $b\gamma_{C3}$ are correction curves for yellow, black, magenta and cyan, respectively. In these examples, respective pairs of $b\gamma_{M1}$ and $b\gamma_{M2}$, and $b\gamma_{C2}$ and $b\gamma_{C3}$ are the same curves. The abscissa represents the input density level of each pixel, and the ordinate represents the density level after correction. In the present case, no correction is performed for yellow which is relatively stable at medium and low densities, and to which human eyes are less sensitive. Accordingly, the correction curve $b\gamma_Y$, which is linear, represented by reference numeral 601 is unconditionally selected. For black which is relatively stable at intermediate and low densities from among the remaining three colors, i.e., M, C and BK, tables $b\gamma_{K1}$ and $b\gamma_{K2}$ represented by reference numeral 602 are alternately selected for every other line. For magenta which is unstable at intermediate densities, tables $b\gamma_{M1}$, $b\gamma_{M2}$ and $b\gamma_{M3}$ represented by reference numeral 603 are prepared, and the three tables are selected for every three lines, such as $b\gamma_{M1}$ for the first line, $b\gamma_{M2}$ for the second line, and $b\gamma_{M3}$ for the third line. Hence, the density initially for three magenta lines is held by two lines, thereby increasing stability in the intermediate density region. For cyan in which low-density portions (highlight portions) are difficult to reproduce, tables $b\gamma_{C1}$, $b\gamma_{C2}$ and $b\gamma_{C3}$ represented by reference numeral 604 are prepared, and the three tables are selected for every three lines, such as $b\gamma_{C1}$ for the first line, $b\gamma_{C2}$ for the second line, and $b\gamma_{C3}$ for the third line. Hence, in low-density regions, the density for three lines is condensed on one line, so that low-density regions are more easily reproduced. Tables for respective colors are determined in the above-described manner. From the viewpoint of preserving the density, it is desirable that the selected two curves are obtained by averaging the curves for two lines in the case of black, and for three lines in the case of magenta and cyan, so as to approach a straight line having the linear relationship of the input level=the output level (broken lines shown in FIG. 5).

Figure 6:
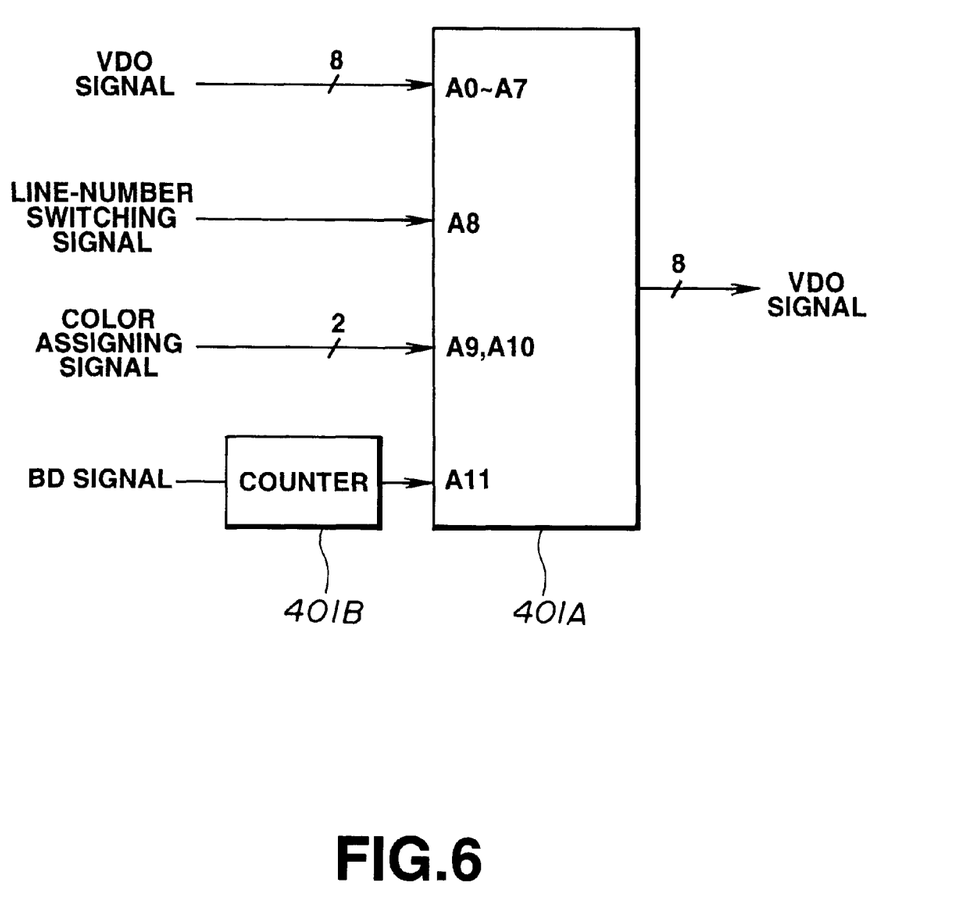
FIG. 6 is a block diagram illustrating a density correction unit of the first embodiment.

As is apparent from FIG. 4, since the size of a printed dot of a 600-line image is smaller than that of a 300-line image, i.e., the density is less stable, a correction curve having a greater inclination is required for a 600-line image. A correction curve for a 600-line image is determined in the same manner as for the correction curve for a 300-line image, while paying attention to the above-described fact. Three tables for a 600-line magenta image are represented by $b\gamma'_{M1}$, $b_{M2}\gamma'$ and $b\gamma'_{M3}$, three tables for a 600-line cyan image are represented by $b\gamma'_{C1}$, $b\gamma'_{C2}$ and $b\gamma'_{C3}$, two tables for a 600-line black image are represented by $b\gamma'_{K1}$ and $b\gamma'_{K2}$, and a table for a 600-line yellow image is represented by $b\gamma'_Y$. FIG. 6 is a diagram illustrating the configuration of a density correction unit for performing the above-described processing. This density correction unit includes a RAM (random access memory) or ROM (read-only memory) 401A. As shown in FIG. 6, a VDO signal representing density data of one of Y, M, C and BK, a color assigning signal assigning one of Y, M, C and BK for data, and a line-number switching signal indicating 300 lines or 600 lines are input to the density correction unit, and a BD signal is input to a counter 401B. A symbol $\gamma$ represents a correction coefficient for making the relationship between density data and the density of a printed image close to linear in the above-described manner. Eight correction coefficients are provided in total, i.e., one for each color and each number of lines. Correction coefficients $\gamma$ for 300-line yellow, magenta, cyan and black are represented by $\gamma_Y$, $\gamma_M$, $\gamma_C$ and $\gamma_K$, respectively. Correction coefficients $\gamma$ for 600-line yellow, magenta, cyan and black are represented by $\gamma'_Y$, $\gamma'_M$, $\gamma'_C$ and $\gamma'_K$, respectively.

Figure 7:
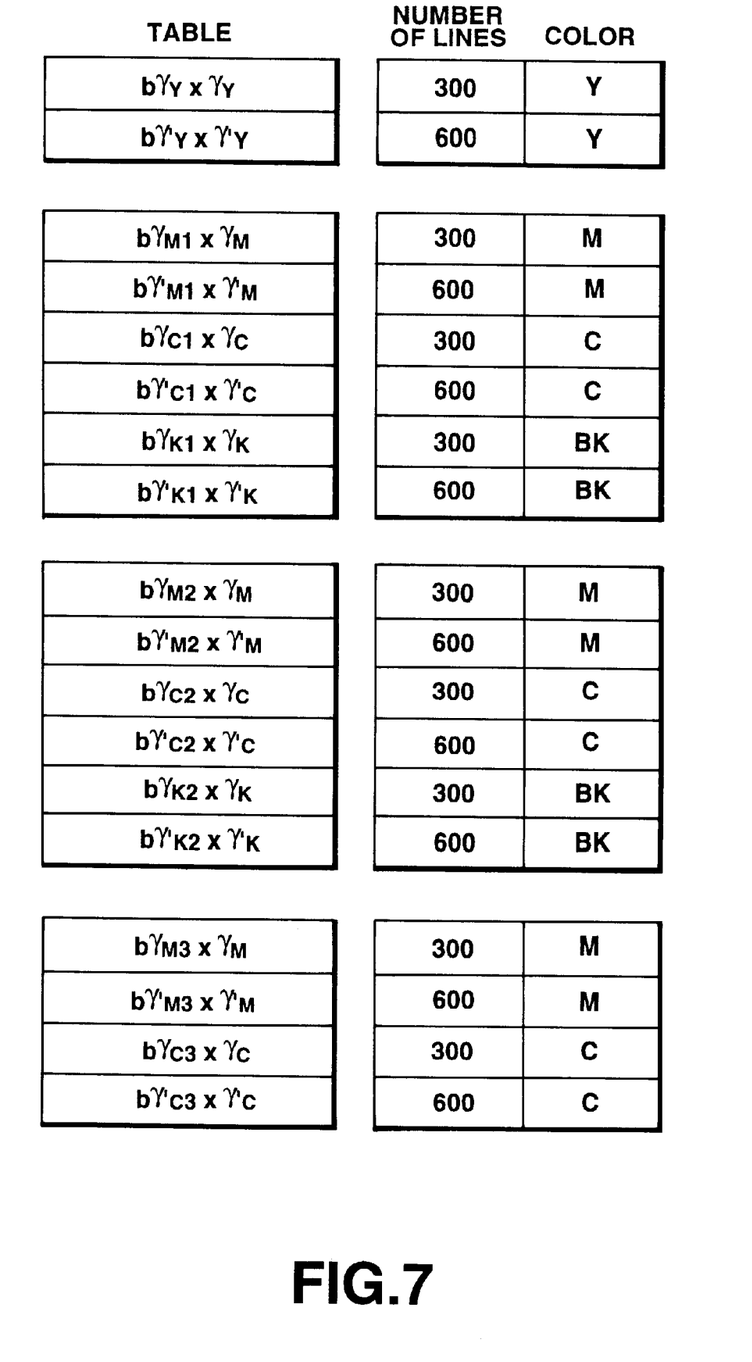
FIG. 7 is a diagram illustrating tables stored in the density correction unit of the first embodiment.

FIG. 7 illustrates the configuration of tables (addresses) stored in the density correction unit shown in FIG. 6. Each table in the density correction unit includes the above-described correction curve multiplied by the correction coefficient $\gamma'$ corresponding to the input color and number of lines. As shown in FIG. 7, 18 tables are present in total. By configuring these tables by the RAM, it is possible to receive data relating to the temperature and humidity measured within the apparatus as signals, and to rewrite the values of $\gamma'$ to values optimum for the measured temperature and humidity.

The density correction unit determines the color and the number of lines for the transmitted density-level signal according to the color assigning signal and the line-number assigning signal, and selects the corresponding table. For example, when 300-line Y data arrives, the table including $b\gamma_Y \times \gamma_Y$ shown in FIG. 7 is selected. When 300-line M, C or BK data arrives, one of the corresponding two tables is selected for the BK data, and one of the corresponding three tables is selected for the M or C data. The selection is performed in the following manner.

By switching the counter 401B shown in FIG. 6 in response to a BD signal transmitted thereto, a different table can be selected for each line. For example, when data for black is input, $b\gamma_{K1} \times \gamma_K$ is selected for an even line, and $b\gamma_{K2} \times \gamma_K$ is selected for an odd line. When data for magenta is input, $b\gamma_{M1} \times \gamma_M$, $b\gamma_{M2} \times \gamma_M$ and $b\gamma_{M3} \times \gamma_M$ are sequentially selected for consecutive lines. When data for cyan is input, $b\gamma_{C1} \times \gamma_C$, $b\gamma_{C2} \times \gamma_C$ and $b\gamma_{C3} \times \gamma_C$ are sequentially selected for consecutive lines. Each of the selected tables comprises 256 addresses, and an address is selected in accordance with the input density level having a value between 00h and ffh. Each address contains an output density level corresponding to an input density level as an output signal from the density correction unit. Thus, the density correction unit outputs a density-level signal for each input density signal. According to this processing of the density correction unit, the level of high-density-level image data is maintained substantially at the original level, and medium-density-level or low-density-level image data is converted into one of high-density image data which can be stably printed or image data having a density close to 0 depending on the line on which the pixel of the data is present.

Second Embodiment

Figure 8:
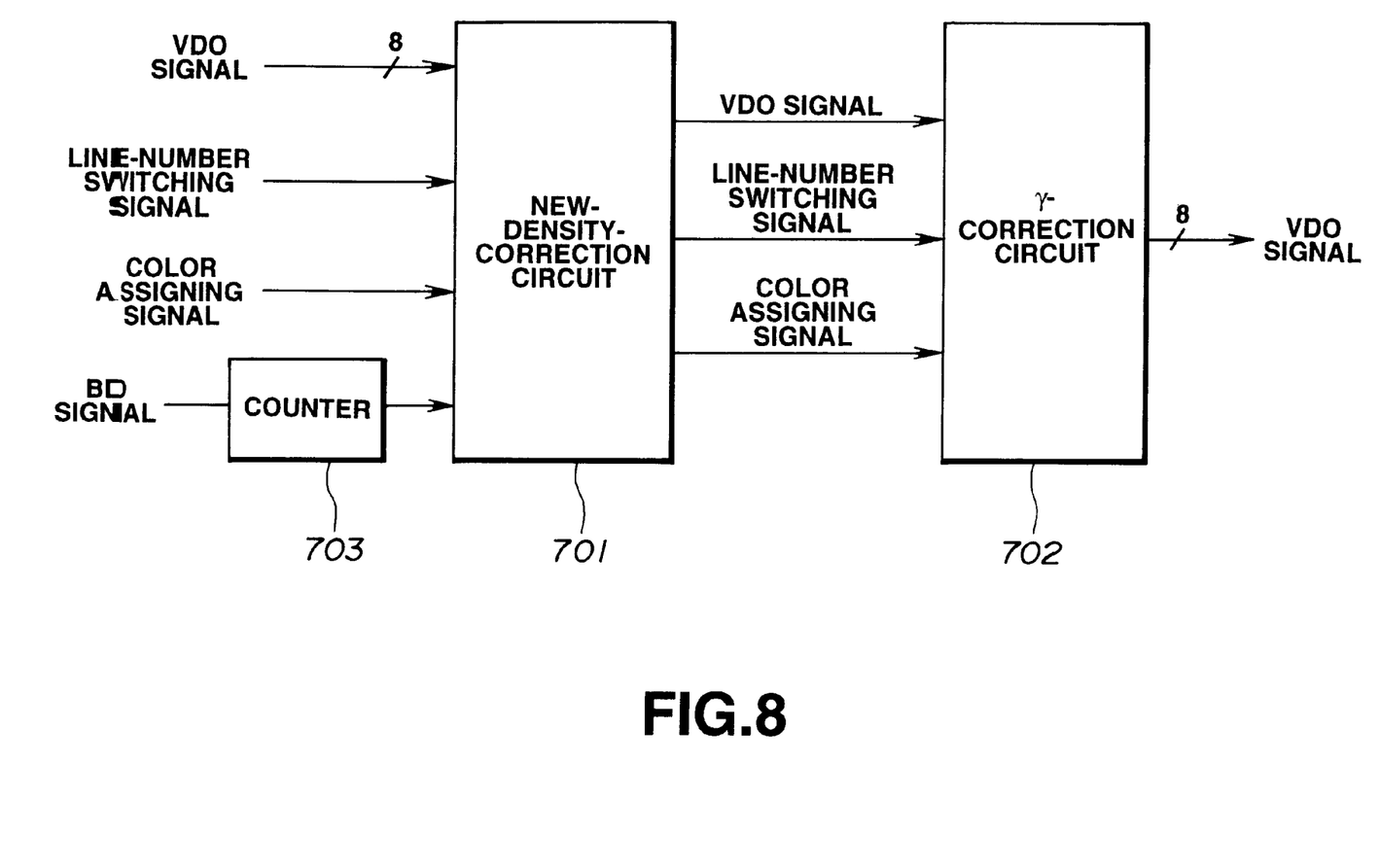
FIG. 8 is a block diagram illustrating a density correction unit according to a second embodiment of the present invention.
Figure 9:
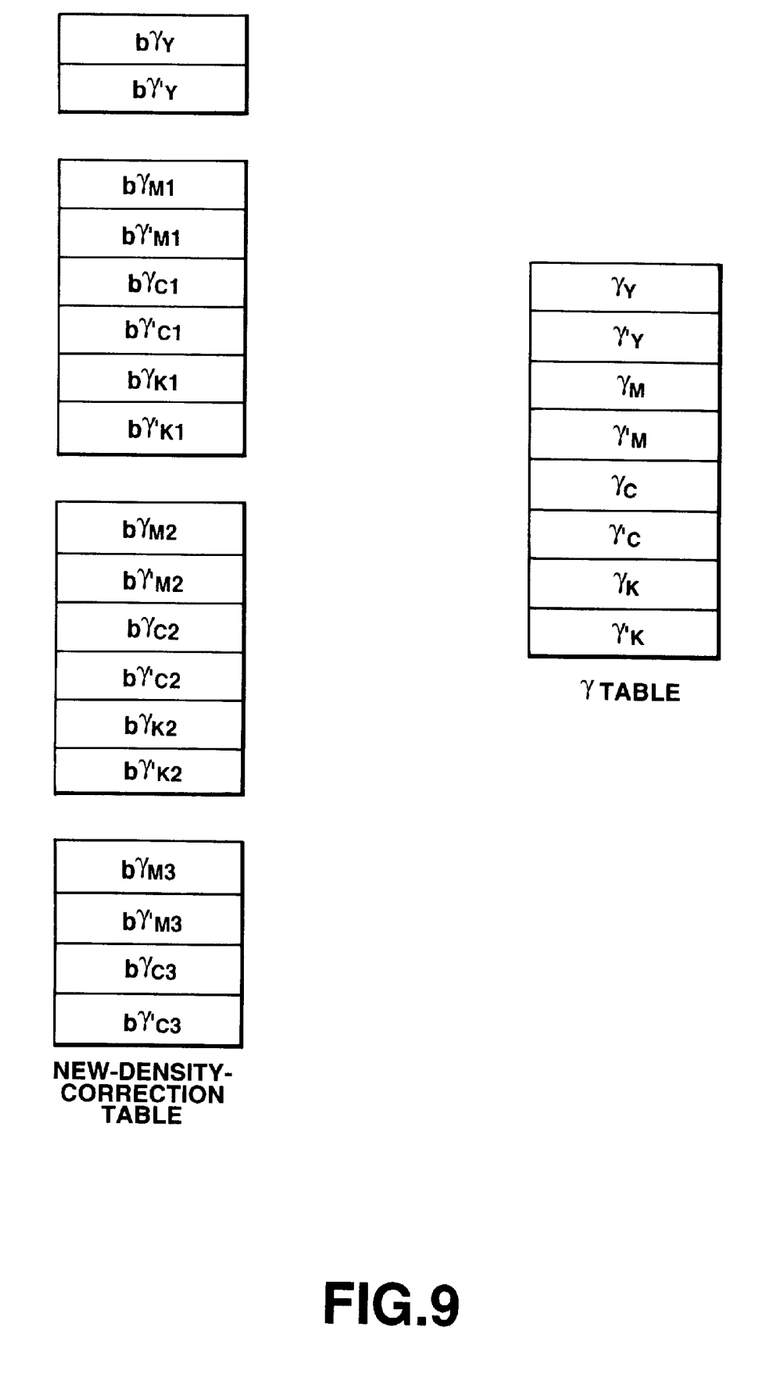
FIG. 9 is a diagram illustrating tables stored in the density correction unit of the second embodiment.

FIG. 8 is a diagram illustrating the configuration of a density correction unit according to a second embodiment of the present invention. In this embodiment, a circuit 701 for performing new density correction and a γ-correction circuit 702 are independent of each other, so that input image data is first subjected to new density correction and is then subjected to γ correction. Assuming that the same table as that used in the first embodiment is used in the present embodiment, tables for new density correction and γ correction have the configuration shown in FIG. 9. The number of tables for new density correction equals two for each of M, C and BK colors, and for each of a 600-line image and a 300-line image, i.e., 18 in total. The number of tables for γ correction equals one for each color and each number of lines, i.e., 8 in total (the same number as in the case of FIG. 7). The γ-correction circuit 702 includes a RAM, so that the values of tables can be rewritten in response to signals indicating the temperature and the humidity measured within the apparatus. The new-density-correction circuit 701 selects two or three tables corresponding to the color and the number of lines assigned by a color assigning signal and a line-number switching signal for input density data, and, as in the first embodiment, selects either two tables or three tables for each line in accordance with a BD signal transmitted via a counter 703. The signal representing density-level data subjected to density correction by the new-density-correction circuit 701 is transmitted to the γ-correction circuit 702 together with a color assigning signal and a line-number switching signal. The γ-correction circuit 702 selects a proper γ-correction table corresponding to the assigned color and number of lines, and performs γ correction.

Third Embodiment

Figure 10:
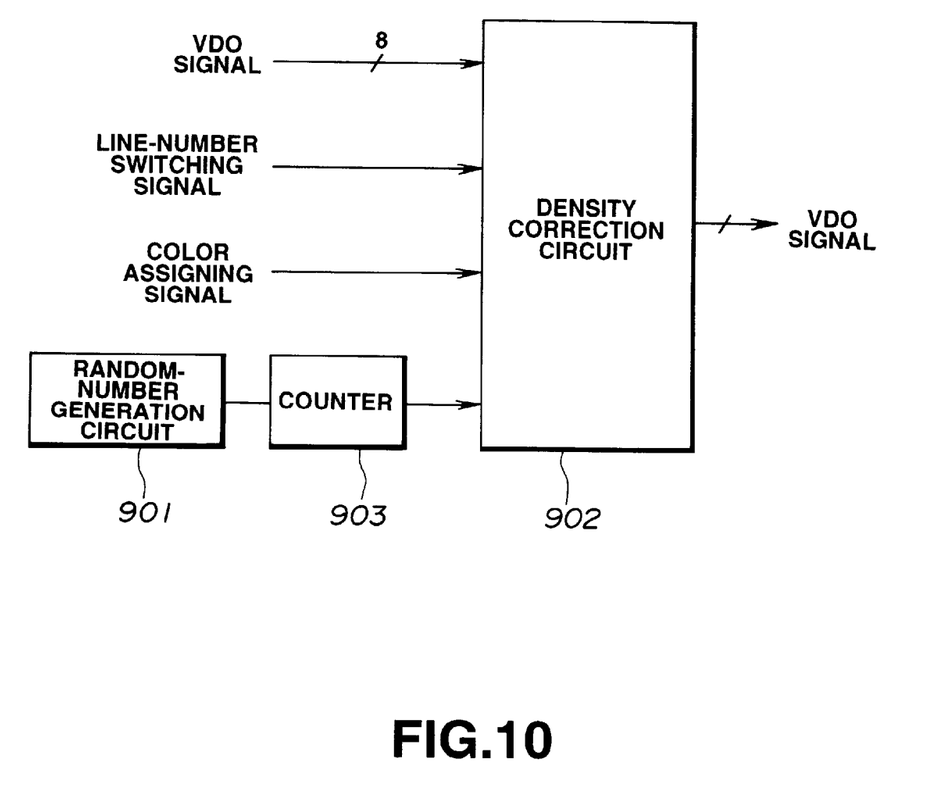
FIG. 10 is a block diagram illustrating a density correction unit according to a third embodiment of the present invention.

FIG. 10 is a block diagram illustrating a density correction unit according to a third embodiment of the present invention. In FIG. 10, a random-number generation circuit 901 generates a pseudorandom number between 0 and 5. In the present embodiment, the density correction tables shown in FIGS. 5 and 7 used in the first embodiment are also used. A table is selected in the following manner. That is, first, a density correction circuit 902 determines the color and the number of lines for the transmitted density-level signal-based on the transmitted color assigning signal and line-number assigning signal, and selects appropriate two or three tables in the following manner. Suppose that 300 lines are selected as the number of lines. A random number between 0 and 5 generated by the random-number generation circuit 901 is transmitted to the density correction circuit 902 via a counter 903 as a signal. When BK has been selected by the color assigning signal, the density correction circuit 902 selects the $b\gamma_{K1} \times \gamma_K$ table when the signal input from the random-number generation circuit 901 comprises 0, 1 or 2, and selects the $b\gamma_{K2} \times \gamma_K$ table when the signal comprises 3, 4 or 5. When M has been selected by the color assinging signal, the density correction circuit 902 selects the $b\gamma_{M1} \times \gamma_M$ table when the signal input from the random-number generation circuit 901 comprises 0 or 1, selects the $b\gamma_{M2} \times \gamma_M$ table when the signal comprises 2 or 3, and selects the $b\gamma_{M3} \times \gamma_M$ table when the signal comprises 4 or 5. As a result, each of the $b\gamma_{M1} \times \gamma_M$, $b\gamma_{M2} \times \gamma_M$ and $b\gamma_{M3} \times \gamma_M$ tables is selected with a probability of ⅓, so that the density is preserved as a whole. When C has been selected by the color assigning signal, the density correction circuit 902 selects $b\gamma_{C1} \times \gamma_C$ tables when the signal input from the random-number generation circuit 901 comprises 0 or 1, selects the $b\gamma_{C2} \times \gamma_C$ table when the signal comprises 2 or 3, and selects the $b\gamma_{C3} \times \gamma_C$ table when the signal comprises 4 or 5. As a result, each of the $b\gamma_{C1} \times \gamma_C$, $b\gamma_{C2} \times \gamma_C$ and $b\gamma_{C3} \times \gamma_C$ tables is selected with a probability of ⅓, so tha density is preserved as a whole. Each of the selected tables comprises 256 addresses, and an address is selected in accordance with the input density level having a value between 00h and ffh. Each address contains an output density level corresponding to an input density level as an output signal of the density correction unit. Thus, the density correction unit outputs a density-level signal for each input density signal.

According to the above-described embodiments, it is possible to stably print a medium-density-level or low-density-level image which will be unstably printed in an unmodified state because the dot size is reduced, and to also reproduce highlight portions, having levels between about 0 and 15 steps when the density level is expressed by 255 steps, in a considerably excellent state. Since the average density of adjacent two or three lines substantially coincides with the average density before correction, the density of the entire image is preserved. In addition, since a line substantially close to white is inserted for every one or two lines for the region of a medium-density image, vertical lines which have been pronounced before the processing become less pronounced, so that an image appears smoother. By providing a γ-correction unit which performs processing in which new-density-correction processing is combined with ordinary correction, it is possible to greatly improve the quality of the obtained image.

The present invention can be executed in various forms without departing from the spirit and the main features thereof.

For example, although in the above-described embodiments, a density correction table is switched for every line, the density correction table may be switched for every other number of lines, for example, for every two lines.

Although in the above-described embodiments, tables are used in density correction, the invention is not limited to such tables, but the present invention may also be achieved by using a calculation circuit. Alternatively, respective correction tables may be independently provided.

In other words, the foregoing description of the embodiments has been given for illustrative purposes only and not to be construed as imposing limitations in any respect.

The scope of the invention is, therefore, to be determined solely by the following claims and not limited by the text of the specification and alterations made within a scope equivalent to the scope of the claims fall within the true spirit and scope of the invention.

The individual components shown in outline or designated by blocks in the drawings are all well known, per se, in the color-image processing arts and their specific construction and operation are not critical to the operation or the best mode for carrying out the invention.

What is claimed is:

1. A color-image processing apparatus comprising:
   a) input means for inputting density data for each of a plurality of colors;
   b) correction means for performing density correction of the density data for each of the plurality of colors input to said input means, the density correction being accomplished for each of the plurality of colors using a plurality of correction tables having a correction curve specific for each of the plurality of colors; and
   c) controlling means for controlling the resolution of an image during image formation in accordance with the density data corrected by said correction means, wherein said correction means selects a correction table from among the plurality of correction tables in accordance with an output of said controlling means.

2. An apparatus according to claim 1, wherein said correction means includes selection means for selecting an arbitrary correction table from among the plurality of correction tables at predetermined periods.

3. An apparatus according to claim 2, wherein said selection means selects one of the plurality of correction tables in a predetermined order for every line.

4. An apparatus according to claim 1, further comprising forming means for forming an image based on the density data corrected by said correction means.

5. A color-image processing apparatus comprising:
  a) input means for inputting density data for each of a plurality of colors; and
  b) correction means for performing density correction of the density data for each of the plurality of colors input to said input means, the density correction being accomplished for each of the plurality of colors using a plurality of correction tables having a correction curve specific for each of the plurality of colors,
  c) selection means for selecting a correction table from among the plurality of correction tables at predetermined periods; and
  d) switching means for switching the mode of the selection by said selection means for every color,
  wherein the plurality of colors includes yellow, and wherein density correction is not performed for density data for yellow.

6. A color-image processing apparatus comprising:
  a) input means for inputting density data for each of a plurality of colors;
  b) correction means for performing density correction of the density data for each of the plurality of colors input to said input means, the density correction being accomplished for each of the plurality of colors using a plurality of correction tables having a correction curve specific for each of the plurality of colors;
  c) selection means for selecting a correction table from among the plurality of correction tables at predetermined periods; and
  d) switching means for switching the mode of the selection by said selection means for every color,
  e) pulse-width modulation means for generating a pulse-width-modulation signal based on the density data corrected by said correction means; and
  f) frequency changing means for changing a spatial frequency of a pulse width in the pulse-width modulation,
  wherein said selection means selects a predetermined correction table from among the plurality of correction tables in accordance with the output of said frequency changing means.

7. An apparatus according to claim 6, wherein said pulse-width modulation means generates the pulse-width-modulation signal by comparing the density data corrected by said correction means with a pattern signal having a predetermined period.

8. An apparatus according to claim 7, wherein the density data input to said input means comprises digital signals for respective pixels, and wherein said pulse-width-modulation means comprises conversion means for converting the digital signals into analog signals when performing pulse-width modulation.

9. A color-image processing apparatus comprising:
  a) input means for inputting density data for each of a plurality of colors; and
  b) correction means for performing density correction of the density data for each of the plurality of colors input to said input means, the density correction being accomplished for each of the plurality of colors using a plurality of correction tables having a correction curve specific for each of the plurality of colors,
  c) selection means for selecting a correction table from among the plurality of correction tables at predetermined periods; and
  d) switching means for switching the mode of the selection by said selection means for every color,
  wherein the plurality of correction tables includes a first correction table for correcting a first color-density level to a corrected density level higher than the first level and a second correction table for correcting the first color-density level to a corrected density level lower than the first level.

10. A color-image processing apparatus, comprising:
  a) input means for inputting density data for a plurality of colors;
  b) correction means for performing density correction for each of the density data for the plurality of colors input to said input means while changing a plurality of correction tables having different density correction characteristics at predetermined periods; and
  c) controlling means for controlling the resolution of an image during image formation in accordance with the density data corrected by said correction means,
  wherein said correction means selects a correction table from among the plurality of correction tables in accordance with the output of said controlling means.

11. An apparatus according to claim 10, wherein the predetermined period comprises one line.

12. A color-image processing apparatus, comprising:
  a) input means for inputting density data for a plurality of colors; and
  b) correction means for performing density correction for each of the density data for the plurality of colors input to said input means while changing a plurality of correction tables having different density correction characteristics at predetermined periods;
  wherein the plurality of correction tables includes a first correction table for correcting a first color-density level to a corrected density level higher than the first level and a second correction table for correcting the first color-density level to a corrected density level lower than the first level.

13. A color-image processing apparatus, comprising:
  a) input means for inputting density data for a plurality of colors;
  b) correction means for performing density correction for each of the density data for the plurality of colors input to said input means while changing a plurality of correction tables having different density correction characteristics at predetermined periods;
  c) pulse-width modulation means for generating a pulse-width-modulation signal based on the density data corrected by said correction means; and
  d) frequency changing means for changing a spatial frequency of a pulse width in the pulse-width modulation,
  wherein said correction means selects a predetermined correction table from among the plurality of correction tables in accordance with the output of said frequency changing means.

14. An apparatus according to claim 13, wherein the density data input to said input means comprises digital signals for respective pixels, and wherein said pulse-width-modulation means comprises conversion means for converting the digital signals into analog signals when performing pulse-width modulation.

15. An apparatus according to claim 14, further comprising forming means for forming an image based on the pulse-width modulation signal generated by said pulse-width modulation means.

16. A color-image processing apparatus, comprising:
   a) input means for inputting density data for a plurality of colors;
   b) correction means for performing density correction for each of the density data for the plurality of colors input to said input means using a plurality of correction tables having different density correction characteristics;
   c) pulse-width modulation means for modulating the density data corrected by said correction means based on a pattern data having a predetermined period; and
   d) changing means for changing the predetermined period of the pattern data,
   wherein said correction means selects a predetermined correction table from among the plurality of correction tables in accordance with the output of said changing means.

17. A color-image processing method, comprising the steps of:
   inputting density data for a plurality of colors;
   performing density correction for each of the density data for the plurality of colors input to said input means while changing a plurality of correction tables having different density correction characteristics at predetermined periods; and
   controlling the resolution of an image during image formation in accordance with the density data corrected by said correction means;
   wherein said correction step selects a correction table from among the plurality of correction tables in accordance with the process of said controlling step.

18. A color-image processing method comprising the steps of:
   inputting density data for a plurality of colors; and
   performing density correction for each of the density data for the plurality of colors input during said input step using a plurality of correction tables having different density correction characteristics,
   wherein the plurality of correction tables includes a first correction table for correcting a first color-density level to a corrected density level higher than the first level and a second correction table for correcting the first color-density level to a corrected density level lower than the first level.

19. A color-image processing method comprising the steps of:
   inputting density data for a plurality of colors;
   performing density correction for each of the density data for the plurality of colors input during said input step using a plurality of correction tables having different density correction characteristics;
   generating a pulse-width-modulation signal based on the density data corrected by said correction step; and
   changing a spatial frequency of a pulse width in the pulse width modulation,
   wherein said correction step selects a predetermined correction table from among the plurality of correction tables in accordance with the process of said changing step.

20. A color-image processing method according to claim 19, further comprising the step of generating the pulse width modulation signal by comparing the corrected density data with a pattern signal having a predetermined period.

21. A color-image processing method comprising the steps of:
   a) inputting density data for each of a plurality of colors;
   b) performing density correction of the density data for each of the plurality of colors input in said input step, the density correction being accomplished for each of the plurality of colors using a plurality of correction tables having a correction curve specific for each of the plurality of colors; and
   c) controlling the resolution of an image during image formation in accordance with the density data corrected in said correction step,
   wherein said correction step selects a correction table from among the plurality of correction tables in accordance with the said controlling step.

* * * * *

UNITED STATES PATENT AND TRADEMARK OFFICE
CERTIFICATE OF CORRECTION

PATENT NO. : 5,926,563

DATED       : July 20, 1999

INVENTOR(S): HIROYUKI YAMAZAKI

It is certified that error appears in the above-identified patent and that said Letters Patent is hereby corrected as shown below:

On the title page:

AT [56] REFERENCES CITED

"Ohtami" should read --Ohtani--.

AT ATTORNEY, AGENT OR FIRM

"Fitzpatrick, Cella Harper & Scinto" should read --Fitzpatrick, Cella, Harper & Scinto--.

COLUMN 1

Line 27, "-correction" should read --γ-correction--.

UNITED STATES PATENT AND TRADEMARK OFFICE
CERTIFICATE OF CORRECTION

PATENT NO. : 5,926,563

DATED : July 20, 1999

INVENTOR(S): HIROYUKI YAMAZAKI

Page 2 of 3

It is certified that error appears in the above-identified patent and that said Letters Patent is hereby corrected as shown below:

COLUMN 3

Line 47, "tranfer" should read --transfer--.

COLUMN 5

Line 64, "$b_{m2\gamma}'$" should read --$b\gamma'_{m2}$--.

COLUMN 6

Line 24, "$\gamma'$" should read --$\gamma$--; and

UNITED STATES PATENT AND TRADEMARK OFFICE
CERTIFICATE OF CORRECTION

PATENT NO. : 5,926,563

DATED : July 20, 1999

INVENTOR(S): HIROYUKI YAMAZAKI

Page 3 of 3

It is certified that error appears in the above-identified patent and that said Letters Patent is hereby corrected as shown below:

Line 29, "γ'" should read --γ--.

COLUMN 7

Line 41, "signal-" should read --signal--; and
Line 54, "assinging" should read --assigning--.

COLUMN 8

Line 1, "tha" should read --that the--.

Signed and Sealed this

Seventh Day of November, 2000

Attest:

Q. TODD DICKINSON

Attesting Officer

Director of Patents and Trademarks